UNITED STATES PATENT OFFICE.

EDUARD MÜNCH, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

VAT COLORING-MATTERS AND PROCESS OF PRODUCING THEM.

1,122,790.      Specification of Letters Patent.      Patented Dec. 29, 1914.

No Drawing.      Application filed August 13, 1912. Serial No. 714,845.

*To all whom it may concern:*

Be it known that I, EDUARD MÜNCH, subject of the King of Bavaria, residing at Ludwigshafen-on-the-Rhine, Germany, have invented new and useful Improvements in Vat Coloring-Matters and Processes of Producing Them, of which the following is a specification.

According to this invention alpha-isatin halogenid, or derivatives thereof all of which compounds I include under the term alpha-isatin halogenid body, are caused to react with derivatives of 1.8-naphthalene-diamin in which the two nitrogen atoms form part of a third ring containing six atoms, whereby coloring matters are obtained which are suitable for application to the fiber in the form of their leuco compounds. The said coloring matters can, if desired, be halogenated, the halogenated products producing dyeings generally of colored shades different from, and often being faster than, those obtained from the non-halogenated products.

The coloring matter thus obtained can be halogenated. For instance, if it be treated with chlorin in the presence of glacial acetic acid and sodium acetate, a brownish yellow chlorinated dehydro compound is obtained, by the reduction of which the chlorinated coloring matter is obtained as a dark blue powder. It dyes cotton fast pure blue shades. If, in this example, instead of isatin alpha-chlorid, other compounds, such for instance, as nitrohalogen-isatin chlorid, or naphthisatin chlorid, be employed, or if, in place of perinaph-thimid-azole, substitution products, or the methin derivatives thereof, be employed, The following will serve to illustrate further the nature of this invention and how it can be carried into practical effect, but the invention is not confined to these examples. The parts are by weight.

Example 1: Prepare a solution of isatin alpha-chlorid from 70 parts of isatin, 100 parts of phosphorus pentachlorid and 600 parts of benzene, and then allow this solution to run into a boiling mixture of 100 parts of peri-naphthimid-azole (perimidin) and 1,000 parts of benzene. The liquid rapidly turns blue and coloring matter is precipitated. Boil for half an hour, cool and filter off the coloring matter and wash it with benzene, and then stir it with an alcoholic solution of sodium acetate and filter. The coloring matter is a violet-blue powder which yields a green-blue solution in concentrated sulfuric acid and a blue solution in nitrobenzene. It yields a yellow vat with alkaline hydrosulfite and dyes cotton and wool violet-blue shades. Its formation can be represented by the equation

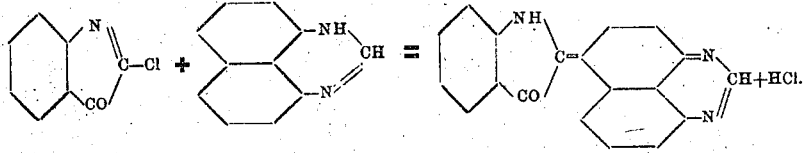

corresponding coloring matters can be obtained.

Example 2: Suspend 100 parts of 1.8-naphthalene-diamin-thiourea in 1500 parts of benzene and add a solution of isatin alpha-chlorid (prepared from 70 parts of isatin). Boil in a reflux apparatus for from 1 to 2 hours, filter off the coloring matter and wash it with benzene and with alcoholic sodium acetate solution. It is a black-blue powder which yields a bluish green solution in concentrated sulfuric acid and a blue solution nitrobenzene. It dyes cotton blue from a yellow vat. Its formation can be represented by the equation

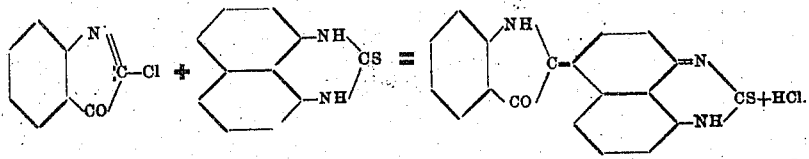

Example 3: Suspend 90 parts of dihydro-perimidon-2 in 750 parts of benzene and add a solution of 5-bromisatin chlorid (prepared from 110 parts of 5-bromisatin, 100 parts of phosphorus pentachlorid and 1300 parts of benzene). Boil in a reflux apparatus for from one to two hours, filter off the coloring matter and wash it with benzene and with alcoholic sodium acetate solution. It is a blue powder which yields a blue-green solution in concentrated sulfuric acid and a blue solution with violet tinge in nitrobenzene. It dyes cotton violet-blue from a yellow vat.

The following table illustrates some of the properties of some of the coloring matters which can be obtained according to this invention.

| Coloring matter from— | Appearance of powder. | Color on the fiber. | Color of vat. | Solution in— | |
|---|---|---|---|---|---|
| | | | | Sulfuric acid. | Nitro-benzene. |
| Perimidin and isatin chlorid | Violet-blue | Blue with violet tinge. | Yellow | Blue-green | Blue. |
| 2-methyl-perimidin+5.7-dibromisatin chlorid | Green-blue | Blue | Yellow | Blue-green | Blue-green. |
| Para-dimethylamino-phenyl-perimidin+isatin chlorid | Green-blue | Blue-green | Yellow | Blue-green | Blue-green. |
| 1.8-Naphthalene-diamin-thiourea+isatin chlorid | Blue-black | Blue | Yellow | Blue-green | Green-blue. |
| 1.8-Naphthalene-diamin-thiourea+5.7-dibrom-isatin chlorid | Blue | Green-blue | Yellow | Blue-green | Green-blue. |
| 1.8-Naphthalene-diamin-thiourea+5-nitro-isatin chlorid | Indigo-blue | Blue-green. (The nitro group is reduced in the vat.) | Yellow | Blue-green | Green-blue. |
| Dihydroperimidon-2+isatin chlorid | Blue | Violet-blue | Yellow | Blue-green | Violet-blue. |
| Dihydroperimidon-2+5-brom-isatin chlorid | Blue | Violet-blue | Yellow | Blue-green | Blue with violet tinge. |

Now what I claim is:—

1. The process of producing vat coloring matters by reacting with an alpha-isatin halogenid body, on a derivative of 1.8-naphthalene-diamin in which the two nitrogen atoms form part of a third ring containing six atoms.

2. The process of producing vat coloring matters by reacting with an alpha-isatin halogenid body, on a derivative of 1.8-naphthalene-diamin in which the two nitrogen atoms form part of a third ring containing six atoms and then treating the product obtained with a halogenating agent.

3. The process of producing vat coloring matter by condensing dihydroperimidon 2 with 5-brom-isatinalphachlorid.

4. As new articles of manufacture the vat coloring matters which contain an alpha-isatin residue and a residue of a derivative of 1.8-naphthalene-diamin in which the two nitrogen atoms form part of a third ring containing six atoms, which new coloring matters consist, when dry, of bluish powders which yield blue-green solutions in concentrated sulfuric acid, from blue-green to violet-blue solutions in nitrobenzene, which yield yellow vats and dye cotton from blue-green to violet-blue shades.

5. As a new article of manufacture the coloring matter obtainable from dihydroperimidon-2 and 5-brom-isatinalphachlorid, which new coloring matter probably possesses a constitution corresponding to the formula

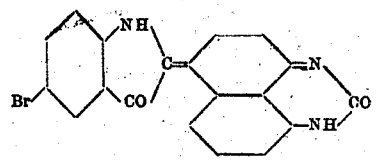

and consists, when dry, of a blue powder, which yields a blue-green solution in concentrated sulfuric acid, a blue solution with a violet tinge in nitrobenzene, and which yields a yellow vat and dyes cotton violet-blue.

In testimony whereof I have hereunto set my hand in the presence of two subscribing witnesses.

EDUARD MÜNCH.

Witnesses:
ERNEST G. EHRHARDT,
JOSEPH PFEIFFER.